Aug. 24, 1965 V. L. SWANSON ET AL 3,202,561
METHOD FOR MAKING ACOUSTICAL TILE WITH
THERMOPLASTIC FILM COVERING
Filed March 30, 1961 2 Sheets-Sheet 2
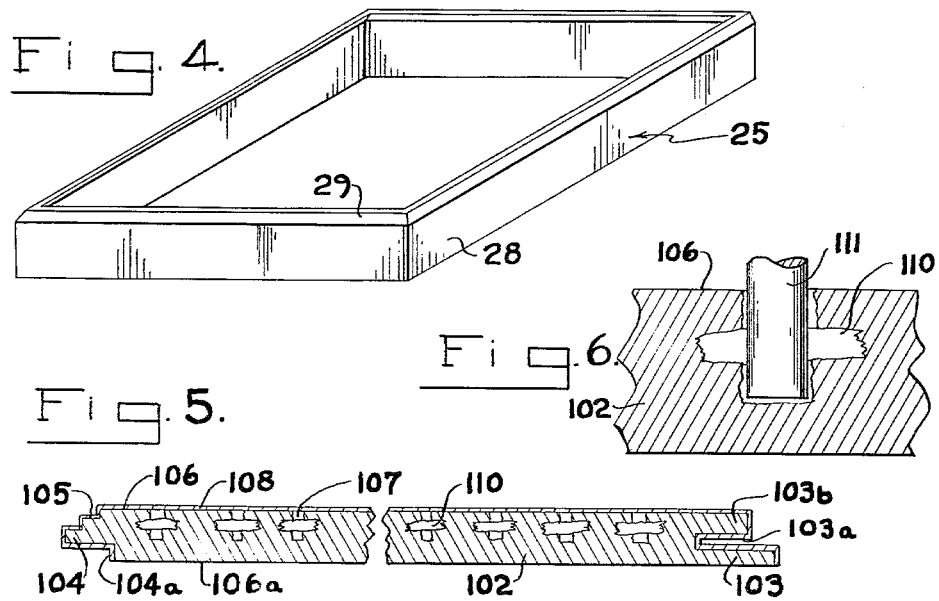
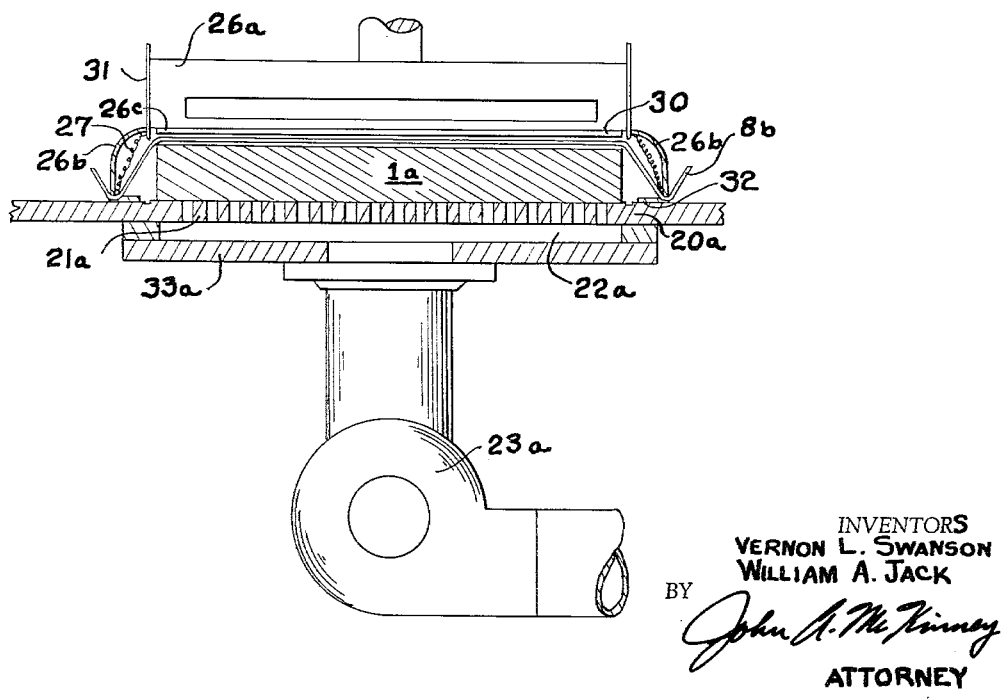
INVENTORS
VERNON L. SWANSON
WILLIAM A. JACK
BY
John A. McKinney
ATTORNEY United States Patent Office 3,202,561
Patented Aug. 24, 1965

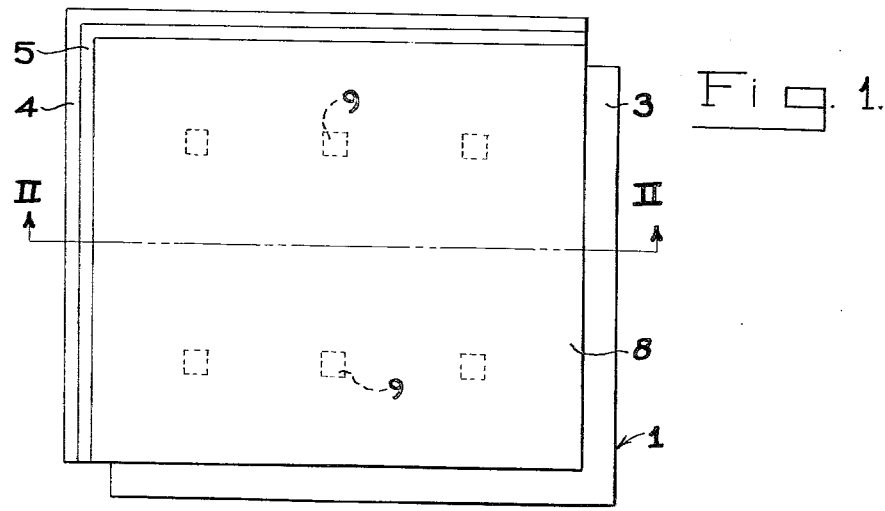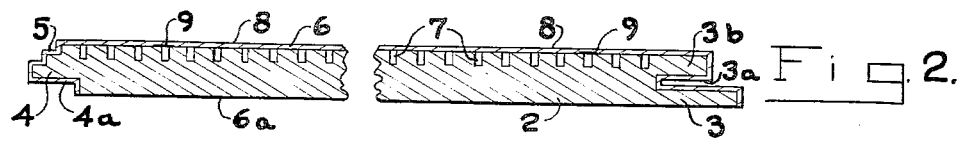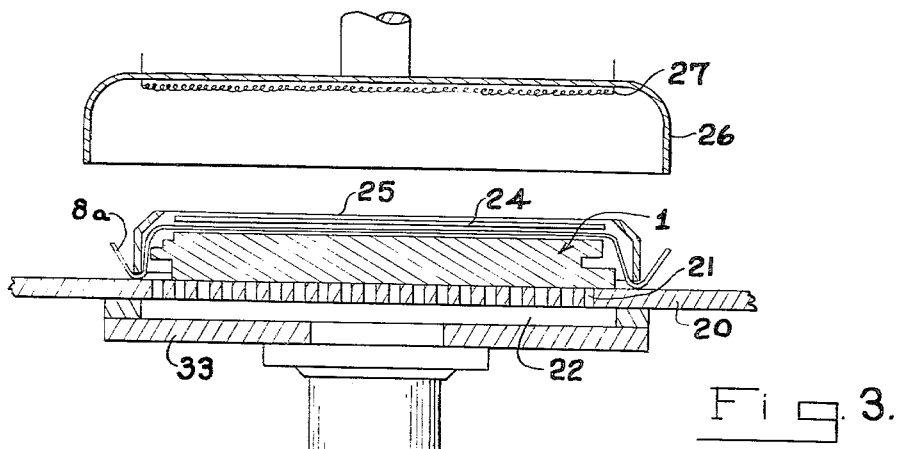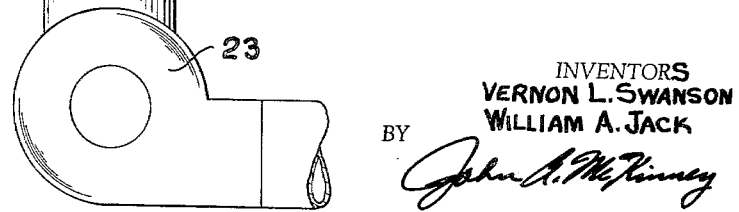

3,202,561
METHOD FOR MAKING ACOUSTICAL TILE WITH THERMOPLASTIC FILM COVERING
Vernon L. Swanson, Somerville, and William A. Jack, Hampton, N.J., assignors to Johns-Manville Corporation, New York, N.Y., a corporation of New York
Filed Mar. 30, 1961, Ser. No. 99,448
6 Claims. (Cl. 156—216)

This invention relates to acoustical panels and/or decorative panels, and, in particular, relates to a novel method of forming an acoustical panel, and to the article produced thereby.

An object of this invention therefore is to provide a novel surface covering for acoustical panels.

An additional object of this invention is to provide a novel method for applying a covering surface to acoustical panels, including panels having kerfed and/or stepped edges.

Another object of this invention is to provide a method for applying a thermoplastic surface covering to acoustical panels, such that rippling of the surface covering is avoided.

Another object of this invention is to provide a method for applying a thermoplastic surface covering to acoustical panels having kerfed edges, such that the covering closely conforms to the wall surfaces of the kerfed edges to cover the same.

An additional object of this invention is to provide an acoustical panel having a thermoplastic surface covering applied thereto, such that the acoustical efficiency of the panel is not impaired.

An additional object of this invention is to provide an acoustical panel having a thermoplastic surface covering applied thereto, and which panel is perforated in a manner to increase the sound absorbing efficiency of such panel.

In brief, this invention relates to an acoustical unit, such as an acoustical panel, having a sound pervious thermoplastic surface covering applied thereto and to the method of applying the same. According to the invention, a thermoplastic surface covering is initially superposed over an acoustical unit. Heat and a pressure differential (vacuum or pressure) are applied to the thermoplastic covering material and the acoustical unit, causing the acoustical unit to have closely conformed thereto the covering material.

In the event that kerfed edges are used in the acoustical unit, as, for example, the kerfed edges found in fiberboard acoustical panels, heat reflectors are utilized during the application of heat to concentrate a greater portion of the applied heat to the areas adjacent the kerfed edges and to reduce materially web formations in the film bridging the kerfs at the edges. The thermoplastic material is caused to be heated to a somewhat greater extent adjacent the kerfed edges than would normally be the case if no reflector was used. With the application of a pressure differential, preferably suction, the thermoplastic material closely follows the contour of the kerfed edges.

The invention also provides for novel steps which insure the subsequent rippling effects in the thermoplastic covering material are avoided. This result is produced by having the acoustical panels "bone dry," or, at least, having a moisture content less than the moisture content that the panel would have under ambient moisture conditions, during application of the surface covering. In lieu thereof, or in addition thereto, adhesive may be applied between the covering surface and the surface of the acoustical panels causing the thermoplastic covering material to be firmly adhered to the front surface of the acoustical panel. By utilizing a certain class of thermoplastic covering materials and applying the same in the manner indicated, the acoustical efficiency of such covered acoustical panels is not impaired.

The acoustical efficiencies of covered panels may even be improved, as compared to conventional acoustical panels, by perforating the basic panels in a particular manner. Thus, for example, in addition to the conventional systems of applying sound absorbing perforations in a surface of a basic panel, the latter surface may have openings therein formed by "blunt punches." The surface, especially where the acoustical panel is of the cellulosic fiber type, formed from a felt deposited on a foraminous surface from a fibrous slurry, as, for example, a felt formed on a Fourdrinier or Oliver machine, or which panel has characteristics similar thereto, has perforations formed therein with delaminated wall areas at least partially circumambient thereto. In prior constructions, the perforations formed were preferably quite small, since there was always danger of destroying the surface integrity of a panel with larger perforations. In the present invention, the perforations formed by blunt punching may be quite large, thereby producing large delaminated areas and possibly destroying the surface integrity of the panel. However, since the perforated areas are to be covered by a surface covering, maintenance of the surface integrity is not as critical as when such perforations are exposed. With the relatively large sized delaminated areas, the sound absorption is vastly improved over conventional panels, even though covered by a thermoplastic surface covering.

The above and other objects will be readily apparent from the preceding brief description, the following description and the included drawings, wherein:

FIG. 1 is a plan view of a cellulosic acoustical panel, having kerfed and stepped edges, and which panel has the thermoplastic surface covering material applied thereto;

FIG. 2 is an enlarged cross-sectional view along section lines II—II of FIG. 1;

FIG. 3 is a cross-sectional vew of the apparatus used to apply the covering material to an acoustical unit;

FIG. 4 is a perspective view of the heat reflector used to obtain better fit or conformance of the covering material on the irregularly contoured areas, as, for example, the kerfed and stepped edges of an acoustical panel;

FIG. 5 is a cross-sectional view, similar to FIG. 2, showing a surface covered acoustical panel having perforations in the covered surface thereof, which perforations have delaminated areas at least partially circumambient thereto;

FIG. 6 is a cross-sectional view of a punch utilized to form the perforations illustrated in FIG. 5; and FIG. 7 is a cross-sectional view of a modified form of heater head.

Referring to FIGS. 1 and 2, a covering 8 is shown as having been applied to a major surface of a fibrous acoustical panel 2. Such panels are relatively thin, usually ranging from approximately ¼" to 1" in thickness. They are relatively planar and usually, but not necessarily, comprise a uniplanar front surface 6 and a uniplanar rear surface 6a. The particular panel illustrated has kerfed and stepped edges so that tight, interlocked joints may be made with other similar panels during installation. Along two sides or edges of the acoustical panel, a protruding flange 3 extends outwardly from the edges of the panel. The flanges 3 are relatively thin, as compared to the thickness of the panel, and a kerf 3a is formed between the body of the flange 3 and the body 3b of the panel adjacent the surface 6 along the edges thereof. At the other pair of edges of the panel, steps are formed so as to be complementary with the flange 3 and the kerf 3a. Thus, edge 4 and edge 5 are stepped from the surface 6 of the panel and also from the edge of the lower surface 6a. The height of the cutout from surface 6a to the lowermost surface 4a of extension 4 is approximately the same as the thickness of flange 3 so that the latter may fit thereinto.

In assembling panels of the type illustrated, edge 4 is abutted with an adjacent panel so that the edge 4 of the panel rides over the flange 3 of an adjacent panel and is fitted into the kerf 3a of the adjacent panel. The side of the edge 5 of the panel abuts the upper portion of the kerf 3a of an adjacent panel, and the uppermost surface of step 5 provides an exaggerated joint effect. The rear face 6a of each panel is planar to produce a planar ceiling; the backing for the rear faces of the panel is an existing ceiling, furring strips, or the like.

A plurality of perforations 7 extend from the surface 6 of the panel to within the body portion thereof. The perforations are illustrated as terminating within the body portion of the panel; however, they may extend completely through the body of the panel, thus extending from surface 6 to surface 6a. In FIG. 2, the perforations are formed in a conventional manner, i.e., either by drilling or pierce punching. The method of forming the perforations does not destroy the surface integrity, and with such perforations, the body portions of the panels are opened up for a greater degree of sound absorption.

A peculiarity noted with perforated panels covered with a 2 mil thickness covering material is the fact that small perforations are invisible through the covering while larger diametered perforations are visible. It has been determined, for example, that with a 2 mil (nominal) thermoplastic film having an embossed pattern (somewhat like a pebble effect), perforations below 1/8" diameter are not visible, while above 1/8" diameter, the perforations are visible through the covering. Such "show-through" would vary with the thickness of the thermoplastic film used and also with the type of pattern (if any) of the film.

Such "show-through" can be avoided, by having the perforations, extending from the surface of the panel to within the body portion thereof, camouflaged by the coloring at the surface. Since the perforations appear through the film as a plurality of black dots, the surface of the panel may be painted black, or any other suitable dark color, and the perforations cannot be distinguished from their background, when the panel is viewed with the surface covering applied.

While an acoustical panel having stepped edges has been depicted and described, it is to be understood that the particular physical configuration of the acoustical unit may take many forms. The particular kerfed and stepped edges illustrated and described may be altered in various ways to provide for different locking arrangements between panels. The edges, per se, may be, for example, straight-sided, that is, where no appreciable stepped edges or kerfed edges are provided, and the panels are merely abutted one against the other. In addition, the acoustical panels may be of the type which are to be suspended by metal suspension bars, as, for example, inverted T runners or Z type runners. To accommodate such suspension runners, the edges are made straight-sided, and a very narrow kerf is formed in the edges thereof for insertion of the runners.

The composition of the acoustical units may be of various kinds. The units may be of the type known in the acoustical art as fiberboard panels, glass-fiber panels, mineral wool panels (made from fibers spun from molten slag), polystyrene panels, perlite panels, perlite and fiber panels, bagasse type panels, or metallic pans having sound absorbing material inserted therein. Preferably, the invention is concerned with the application of a thermoplastic covering material on panels of the cellulosic fiber type. These panels are formed on a Fourdrinier or an Oliver machine from mixtures of cellulosic fibers, as, for example, wood fibers, bagasse, cornstalks, and the like, and a binder material. After being formed into a mat, the latter is compressed to the proper density to drive out a substantial portion of the water contained therein and is subsequently dried to remove the remaining portion of the entrapped water. After the drying operation, perforations or ports 7 may be punched or drilled into the surface of the tile, and, if necessary, the edges are machined to provide the proper contour thereto.

If the mineral wool panels are used, such panels may be formed by a process similar to that described with cellulosic panels, except that the cellulosic fibers in the slurry are substituted by fibers of mineral wool. The panels of the mineral wool type may also be manufactured by what is known as the nodular wool process, wherein nodular mineral wool is intermixed with a high concentration of binder, such as starch, and the resultant stiff slurry is formed into sheets, dried, and cut into panels of the proper dimension.

It is to be understood that the fibrous panels need not be made exclusively from one class of fibers, as intermixtures of fibers are possible in manufacturing panels.

The acoustical panels of the present invention may also be of the metallic pan type, wherein the pans are formed from thin sheet aluminum or steel, for example, and a plurality of perforations are formed therein. The edges of the pans are turned up and provided with means so that they can be suspended from a metal runner-type suspension system. Acoustical pads are inserted into the pans so as to absorb the sound passed through the perforations received from the interior of a room compartment. Acoustical systems of this type are marketed, for example, under the Johns-Manville Corporation trademark "Sanacoustic."

The surface of the acoustical panel, of the type described, has applied thereto a thermoplastic covering material 8 (FIG. 2), such that the material adjacent the upper major surface closely follows the contour of the surface 6. In the particular panel illustrated, the covering material also follows the contour of the stepped edges and kerfed edges. The covering material adjacent the surface 6 may or may not be adhered thereto. If the covering material is to be secured to the surface 6 of the panel, a plurality of tabs of adhesive 9 may be located between the covering material and the surface 6 of the panel, firmly bonding the material thereto. However, in a further embodiment of the present invention (hereinafter disclosed), the adhesive need not be used on the major surface, and the covering material 8 can be made to follow the contour of the surface 6 very closely.

Referring to FIGS. 3 and 4, the apparatus for applying the thermoplastic covering material or film to a major surface of the acoustical unit comprises a plate or table 20 having a plurality of ports 21 extending therethrough. At the lower portion of the plate, a portion of the frame support 33 forms a duct 22, with the latter and the ports 21 being in pneumatic communication. The duct 22 is connected to a vacuum pump or blower 23 in a manner so as to provide a withdrawal of air from ports 21, thus, in effect, applying a vacuum to the lowermost portion of the plate and to the uppermost portion thereof through the ports 21. A sheet of thermoplastic covering material 8a is superimposed over an acoustical panel 1, the latter being rested upon the upper surface of the platform 20. A moveable heater head 26 is located above the platform 20 and is of a configuration so as to cover the plate 20 in a relatively airtight manner, so that the entrapped air between the plate 20 and the cover 26 (when the head is lowered) may be withdrawn in an effective manner. A heater 27 is located within the cover or head 26 and is located therein so as to properly apply heat to the thermoplastic covering material 8a after the cover 26 is properly mated with the plate 20.

During the application of the covering material to an acoustical unit, a panel 1, for example, is first centrally located on the plate 20 and a sheet of thermoplastic material 8a is extended across the panel. If the panel has straight-sided edges, adhesive may be applied to the side edges of the panel. The cover 26 is lowered until it is in proper engagement with the plate 20. The vacuum is applied to the acoustical panel and the undersurface of sheet 8a, through the pump or blower 23, duct 22, and perforations 21. Simultaneously, heat is applied as, for example, by applying current to the coils 27 in the head 26. Preferably, the heat is momentarily applied prior to suction to make the combined action more effective. If the design in the thermoplastic covering material 8a is desired to be maintained, a reflector plate 24 is applied over the acoustical panel and covering material 8a, which protects a particular portion of the material from the effects of the heat source 27. After several seconds of such heating and application of pressure differential, the head 26 is withdrawn and the vacuum is cut off. During such suction and heat application, the thermoplastic material adjacent the sides has been softened and made to follow the irregular contours of the acoustical panel adjacent the edges thereof so as to be firmly adhered thereto. A knife, which may be incorporated into the head, is used to trim the excess material from the acoustical panel, and the finished covering on the acoustical panel is as depicted in FIG. 2.

In order to obtain better conformance or fit between the covering material and the acoustical panel, a heat reflector 25 may be used to encircle the acoustical panel during covering application. Where such a reflector is not used, the thermoplastic covering material has a tendency to form "webs" within the kerfs, rather than conform closely to the wall areas at the side edges. Referring to FIG. 4, the reflector comprises a rectangular annulus having vertical sides 28 and a converging lip 29 projecting upwardly and inwardly from each of the sides. During application of heat, the reflector, made from aluminum, sheet steel or the like, acts to concentrate the heat rays to the portions of the thermoplastic material closely adjacent the stepped or kerfed edges. By such reflection of the heat rays, the edges of the thermoplastic material are softened to a greater extent that other portions thereof so that the suction effect is more effective in causing the thermoplastic material to follow the contours of the panel. With the use of a heat concentrator, the total amount of heat radiated to the thermoplastic covering may be reduced. This helps to preserve the design on and in the covering material, as the protective shield 24 is usually also a conductor to some extent. Thus, reduction of heat also reduces the amount of heat absorbed by the shield, decreasing the chances of hot spots of heat being applied to the material 8a through the shield.

The shield itself may take many forms, depending upon the type of covering material used and the effects desired to be produced. It may, for example, be in the form of a template with cut-outs therein. When the heat is applied, the portion of the film, not covered by the template, is softened. If the covering material has an embossed design therein, the embossing is lost, and the unprotected portion of the film reverts to its uniplanar or smooth state. The design in the film under the solid portions of the template can consequently be made to be markedly different from the design in the areas of the film under cut-outs in the template. The reflector can become very important when the surface design is to be altered, since the heat, to which the panel is subjected, can be applied in different intensities at different areas of the panel.

The above technique may also be applied, where the covering material is made to conform to irregular contours of a major surface of a panel. Where the surface has such an irregular contour, the covering material may be protected by a flat shield, and the suction, or other pressure differential force, through the panel and adjacent thereto, causes the film to conform closely to the contours of such surface. Subsequent thereto, a second shield, preferably in the form of a template, is superposed over selected areas of the surface, and heat is momentarily re-applied. The areas of the film covering the surface and unprotected by the template, revert back to their smooth state and cease to follow the surface contour but revert to a planar condition.

The techniques in imparting a surface design thus may be governed by the contour of a major surface of the panel, the embossment on the film, and the configurations of the templates or shields.

Acoustical panels, covered in the manner indicated, at times exhibit a rippling effect in the thermoplastic covering material after a period of being suspended, depending upon the type of material used to form the body of the panels. This effect is believed to be caused by moisture evaporation and absorption (causing contraction and expansion of the panel) when the panel attempts to maintain an equilibrium condition with the moisture in the atmosphere. For example, the moisture contained in a cellulosic wood fiber acoustical panel, under average ambient moisture conditions and at average ambient temperature, is between about 5% to about 8% by weight. The percentage of contained moisture either decreases or increases, from time to time, depending upon the moisture conditions of the ambient atmosphere. As a result, it is believed that under such constant moisture evaporation and absorption in very small amounts, the rippling effect becomes more pronounced under relatively dry ambient conditions and less pronounced under high moisture conditions. It is believed that with high ambient moisture conditions, the panel absorbs moisture from the atmosphere and the panel expands. The covering material is stretched during such expansion and becomes taut. When the moisture content of the ambient air decreases appreciably, the panel evaporates moisture therefrom. However, the covering material has been stretched but does not contract as readily as the panel. The film does attempt to contract back to its original condition somewhat, but it cannot do so completely. Consequently, the panel becomes smaller than the covering, and the latter tends to sag away from the adjacent major surface of a panel. The sag is often evidenced by a plurality of surface ripples in each panel. The critical condition is believed to be that moisture condition of the panel at which the covering is applied.

To offset such rippling effect, dabs 9 of adhesive may be applied as illustrated in FIGS. 1 and 2 to the surface of the acoustical panel prior to the application of the thermoplastic covering 8a. Strips of adhesive or a complete adhesive covering may also be used in lieu of dabs of adhesive. After the application of heat and suction, the material 8a bonds itself to the adhesive 9, which in turn is bonded to the surface 6 of the acoustical panel.

In lieu thereof, or in addition thereto, the acoustical panels 1, when inserted into the surface covering applying machine, may be such that they are devoid of moisture, that is to say, "bone dry." This result may be obtained by reheating the panels or redrying the panels in a heating oven, so that the moisture contained within the panels is reduced to approximately 1 or 2% by weight. Moisture removal must be had at least to the extent where the amount of moisture in the panel during application of the covering is less than that minimum amount the acoustical panel would have therein under expected minimum moisture conditions of ambient. When the covering is applied to a panel having a low moisture content, it is believed that the covering is soon under constant tension by expansion of the panel upon its absorbing moisture; in spite of moisture fluctuations in the ambient air and the panel (causing expansion and contraction of the panel), constant tension is believed to be always maintained. Only under the most extreme conditions can the panels of a ceiling be subjected to ambient moisture conditions so as to have their moisture content reduced back to 0%, or 1–2% moisture. Thus, being always taut, the surface covering material has only its degree of tautness changed by normal fluctuations in ambient moisture; such changes in degree of tautness prevent rippling or sag of the covering film.

A similar result may be obtained by applying the surface covering or film soon after exit of fibrous acoustical panels from a drier used to remove moisture from the wet mats of panels or sheets, which are initially formed on a Fourdrinier or Oliver machine. Thus, during such a panel's formation, wherein it enters the drier with a moisture content of approximately 25–65%, the panel, after exiting from the drier, is in a "bone dry" state, wherein the moisture within the panel borders on 0%. The covering material can be applied after the panel has cooled somewhat but prior to its absorption of any appreciable moisture from the atmosphere, at least to the extent of being applied prior to the time the panel reaches a steady state equilibrium moisture condition with ambient. It is to be understood that such equilibrium condition usually takes from approximately 12–24 hours. Thus, the fabricated panels may be stored for a relatively short period of time, during which they may be allowed to cool to ambient temperature, before application of the covering thereto.

One of the particular advantages of the present invention is the fact that, by the application of the thermoplastic surface covering in the manner herein disclosed, no reduction in average sound absorption results, i.e., when standard acoustical panels are used as the basic panels. Indeed, the sound absorption of such panels may be increased, as compared to the sound absorption of conventional panels and even though the panels are covered, by utilizing the construction illustrated in FIG. 5. Referring thereto, the acoustical panel 102 is formed in cross-sectional configuration similar to the panel illustrated in FIG. 2. Thus, steps 104, 105 are formed on a pair of adjacent edges of the panel 102, and flanges 103, kerfs 103a, and lips 103b are formed in the other pair of adjacent edges. Perforations 107 extend from the surface 106 to within the body portion of the panel. Each perforation 107 has a marked delaminated area 110 at least partially circumambient thereto. The sound pervious, thermoplastic surface covering 108 is applied to the panel to cover surface 106 and the side edges in the manner described herein.

The perforations are formed by utilizing a blunt punch 111, which is forced into panel 102 until this effect occurs. The method is described in the copending application 777,674 of William A. Jack and Samuel G. Nelson having a filing date of December 2, 1958, and assigned to the present assignee of record. A double delamination effect may be produced by continuing the pressing of the blunt punch until a marked yielding action occurs. This method and the panel produced are more fully described in copending application 780,836 of William A. Jack and George W. Constantin having a filing date of December 18, 1958, and assigned to the instant assignee.

As disclosed in the two applications, preferably the basic panel is a water-laid cellulosic panel, or one having the basic characteritics of a water-laid fibrous panel. For example, such panels may be formed on an Oliver or Fourdrinier machine from slurries containing cellulosic or mineral wool fibers.

In the above noted applications, the punch diameter is kept relatively small, i.e., between approximately 1/16" to 1/4" or 5/16". This is due to the fact that when the formed perforations are closely spaced, it is difficult to maintain the integrity of surface 106. However, with a surface covering being applied over a major surface 106, maintaining the surface integrity is not as important as when the panels are to be used with their major surfaces exposed to view. As a result, the diameter of the punches may be increased considerably, up to, say 1/2", or thereabouts. By increasing the diameter of the punches, the delaminations at least partially circumambient the perforations are increased in size very considerably; in addition, the large size punches, in most instances destroy the surface integrity of a panel. Such larger delaminations tend to open up the body portion of the panel to a considerable degree, thereby producing a marked improvement in sound absorption of the panels.

The thermoplastic surface covering materials of this invention are in relatively thin sheets and are of a nature where they are readily softened by momentary application of heat, as, for example, 2 or 3 seconds. A material of this type is an unplasticized (or deplasticized) polyvinyl chloride film, manufactured by Elm Coated Fabrics Co., Inc. (New York City, New York, United States of America), under the trademark "Vylene" and by the Pantasote Company (New York City, New York, United States of America), under the trademark "Pantex." Such films are generally known merely as 2 mil (or 1½ mil or 3 mil) unplasticized vinyl films. The thickness of such covering materials or films varies between about 1.5 to about 3 mils; sheets of a thickness of about 2 mils (nominal) have produced excellent results (weighing approximately 15 pounds per 1,000 square feet or 7⅓ square yards per pound). The covering materials used may have various surface designs thereon forming an integral part of the material, or the designs may be imprinted thereupon, as by ink printing.

In applying the surface covering material to a panel, a vacuum force is preferred to be utilized. However, it is to be understood that other forms of pressure differential systems may be substituted therefor. For example, air pressure may be applied over the material during its application; such air pressure may be applied to the heater head after lowering thereof on the panel. A combination of air pressure on the film and vacuum under the film may also be used.

The construction of the heater head may be such as to incorporate therein the localized heat reflecting feature by relating the heater to a particular configuration of the head. Referring to FIG. 7, an acoustical panel 1a is placed upon a table 20a. A layer of thermoplastic film 8b is placed over the panel; when the movable head 26a is lowered over the panel, the film is drawn relatively taut. A glass fiber pad 30 is secured to the ceiling 26c of the head 26a and holds the film to the panel during the application of the covering. The panel illustrated is straight sided; i.e., the edges are not kerfed. Adhesive may be applied to the side edges 1b before application of the covering to obtain better adherence between the film and the panel. Adhesive may be used at the side edges even when the edges are kerfed. In some panel constructions, the kerfs at the edges are very narrow, of a size sufficient only to receive a thin sheet of support metal. With such kerfs, the film does not enter into the kerfed areas. Consequently, if the kerfs are already formed, the covering material must be slit or placed over the side edges so as not to cover the kerfs. On the other hand, the narrow kerfs may be cut into the side edges after the covering material has been applied. If adhesive is used to adhere the film to the side edges, there is no danger of the film becoming loose.

At the sides of the movable heater head, the contour of the head is made in generally quadrant form (in cross-section), as side extensions 26b. The heater 27 is diagonally placed within the extensions 24; the heater, by direct radiation of heat and by reflection of heat, concentrates the heat applied to the film at the sides of the panel. A cushion 32 may be used at the free terminal of the extension 26b to obtain a better seal of the head when placed in covering application position. If necessary, additional heaters may be placed adjacent ceiling 26c and the pad removed to impart heat to that portion of the covering material on the upper surface of the panel. Movable knives 31 may be used to trim the excess material applied to the panel.

In operation, the results are the same as those previously described. After placement of the pad 1a, the head 26a is lowered over the panel, resting the pad 30 upon the panel 1a. Current is applied to heaters. The applied direct and reflected heat is localized to the edge area of the panel and the film adjacent thereto. Subsequent to the heating or simultaneously therewith, vacuum is applied to the panel via duct 22a and ports 21a. After the film's conformance to a major surface and the side edges of the panel, the trimmer knife 31 may be actuated to trim any covering material excess. The knife may be heated to facilitate trimming; in FIG. 7, the tips of the knives absorb some of the heat radiated from heaters 27.

An acoustical ceiling, formed from panels covered as disclosed herein, can have any design imparted thereto, since the overall ceiling design is governed by the design of the film or the design imparted to the film by the techniques described herein. The film, itself, is sound transparent or transmitting, but air impervious; consequently, the acoustical efficiency of the overall ceiling is determined primarily by the coefficient or efficiency of the individual panels. As described herein, panel constructions may be utilized which result in surface configurations which may be considered unattractive, but which panels have excellent sound absorbing characteristics. These panels may be used, since the esthetic characteristics of the ceiling are governed by the film and the sound absorbing characteristics are governed by the panels, per se.

With metallic sound absorbing ceilings, the instant invention is also particularly attractive, since the covering film may be applied to existing ceilings. Over a period of years, the acoustical efficiency of such ceilings remains high but the esthetic characteristics are lowered to a certain degree. By applying a film, as disclosed herein, to the viewable perforated surface of the pans, the esthetic characteristics are improved to a considerable extent, while the sound absorbing characteristics are not altered, the film being sound pervious or transparent.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. A method of forming an acoustical panel comprising superposing a sheet of thermoplastic material over a major surface of an acoustical panel, maintaining the acoustical panel substantially devoid of moisture, heating said thermoplastic material, and applying suction to the thermoplastic material and acoustical panel while said covering material is hot, thereby causing the covering material to closely adhere to said major surface of the panel.

2. A method of applying a sheet of thermoplastic material as a covering for a surface of an acoustical panel comprising maintaining the acoustical panel with a moisture content less than that amount that it would have under average ambient conditions, superposing a sheet of polyvinyl chloride film material over a major surface of the panel, applying heat to said sheet, protecting a portion of the sheet from the applied heat, and applying suction to said sheet and to the acoustical panel while the heated sheet is at least still warm, thereby causing the sheet to follow relatively closely the contour of the panel.

3. A method of applying a sheet of thermoplastic material as a covering for an acoustical panel having kerfed edges comprising maintaining the acoustical panel with a moisture content less than the amount that it would contain under average ambient conditions, superposing a sheet of thermoplastic material over a major surface of the panel, applying heat to said sheet, protecting a portion of the sheet from the effects of the applied heat, and applying suction to said sheet and to the acoustical panel while the sheet is still hot, thereby causing the sheet to follow relatively closely the contour of the panel and the kerfed edges.

4. A method of forming an acoustical panel comprising maintaining an acoustical panel, having a major surface and side edges, with a moisture content less than it would contain under average ambient conditions, and applying a sheet of thermoplastic covering material to the major surface and side edges of the panel before the panel reaches a steady state moisture condition with the atmosphere adjacent thereto.

5. A method of forming an acoustical panel comprising maintaining a relatively planar acoustical panel with a moisture content less than it would contain under average ambient conditions, applying dabs of adhesive to a surface of the panel, and adhering a sheet of thermoplastic covering material to a major surface and side edges of the panel before the panel reaches an equilibrium moisture condition with the moisture laden atmosphere adjacent thereto.

6. A method of forming a cellulosic fibrous acoustical panel comprising forming a plurality of perforations in a surface of the cellulosic panel so as to open the body thereof to better absorption of sound, maintaining the panel with a moisture content less than it would contain under average ambient conditions, and applying a sheet of thermoplastic covering material to the perforated surface and side edges of the panel before the panel reaches an equilibrium moisture condition with the atmosphere adjacent thereto.

References Cited by the Examiner

UNITED STATES PATENTS

| | | | |
|---|---|---|---|
| 2,029,441 | 2/36 | Parkinson | 181—33 |
| 2,045,312 | 6/36 | Roos et al. | 181—33 |
| 2,274,495 | 2/42 | Muench | 181—33 |
| 2,614,059 | 10/52 | Cooper | 181—33 |
| 2,690,593 | 10/54 | Abercrombie | 181—33 |
| 2,694,233 | 11/54 | Page | 181—33 |
| 2,802,764 | 8/57 | Slayter et al. | 181—33 |
| 2,814,077 | 11/57 | Moncrieff | 181—33 |
| 2,915,427 | 12/59 | Schriner et al. | 181—33 |
| 2,968,327 | 1/61 | Mariner | 181—33 |
| 2,990,027 | 6/61 | Sabine | 181—33 |
| 3,013,626 | 12/61 | Brown et al. | 181—33 |
| 3,017,947 | 1/62 | Eckert | 181—33 |
| 3,118,516 | 1/64 | Feid | 181—33 |

FOREIGN PATENTS

| | | |
|---|---|---|
| 531,798 | 10/56 | Canada. |
| 768,826 | 2/57 | Great Britain. |
| 784,503 | 10/57 | Great Britain. |
| 863,611 | 3/61 | Great Britain. |
| 106,399 | 1/43 | Sweden. |

LEO SMILOW, *Primary Examiner.*

C. W. ROBINSON, LEYLAND M. MARTIN,
*Examiners.*